United States Patent
Griffith et al.

(10) Patent No.: US 9,767,233 B2
(45) Date of Patent: *Sep. 19, 2017

(54) NESTING USING RIGID BODY SIMULATION

(71) Applicant: AUTODESK, Inc., San Rafael, CA (US)

(72) Inventors: Saul Griffith, San Francisco, CA (US); Martin Wicke, San Francisco, CA (US); Keith Pasko, San Francisco, CA (US); Geoffrey Irving, San Francisco, CA (US); Samuel Eli Calisch, San Francisco, CA (US); Tucker Gilman, San Francisco, CA (US); Daniel Benoit, Alameda, CA (US); Jonathan Bachrach, Berkeley, CA (US)

(73) Assignee: AUTODESK, INC., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,302

(22) Filed: Nov. 14, 2016

(65) Prior Publication Data

US 2017/0061051 A1    Mar. 2, 2017

Related U.S. Application Data

(63) Continuation of application No. 14/029,353, filed on Sep. 17, 2013, now Pat. No. 9,495,484.

(60) Provisional application No. 61/702,663, filed on Sep. 18, 2012.

(51) Int. Cl.
*G06F 17/50* (2006.01)

(52) U.S. Cl.
CPC .......... *G06F 17/5009* (2013.01); *G06F 17/50* (2013.01); *G06F 2217/12* (2013.01); *G06F 2217/42* (2013.01); *Y02P 90/265* (2015.11)

(58) Field of Classification Search
CPC .. G06F 17/50; G06F 17/5009; G06F 2217/12; G06F 2217/42; Y02P 90/265
USPC .................. 703/1; 700/97–98; 345/419–420
See application file for complete search history.

(56) References Cited

U.S. PATENT DOCUMENTS

| | | |
|---|---|---|
| 7,643,968 B1 | 1/2010 | Lambert et al. |
| 2002/0161562 A1 | 10/2002 | Strunk et al. |
| 2008/0010041 A1 | 1/2008 | McDaniel |

*Primary Examiner* — Eunhee Kim
(74) *Attorney, Agent, or Firm* — Artegis Law Group, LLP

(57) ABSTRACT

Embodiments of the invention provide systems and methods for nesting objects in 2D sheets and 3D volumes. In one embodiment, a nesting application simplifies the shapes of parts and performs a rigid body simulation of the parts dropping into a 2D sheet or 3D volume. In the rigid body simulation, parts begin from random initial positions on one or more sides and drop under the force of gravity into the 2D sheet or 3D volume until coming into contact with another part, a boundary, or the origin of the gravity. The parts may be dropped according to a particular order, such as alternating large and small parts. Further, the simulation may be translation- and/or position-only, meaning the parts do not rotate and/or do not have momentum, respectively. Tighter packing may be achieved by incorporating user inputs and simulating jittering of the parts using random forces.

21 Claims, 9 Drawing Sheets

NESTING USING RIGID BODY SIMULATION

CROSS-REFERENCE TO RELATED APPLICATIONS

This application is a continuation of the U.S. patent application titled, "NESTING USING RIGID BODY SIMULATION," filed on Sep. 17, 2013 and having Ser. No. 14/029,353, now issued as U.S. Pat. No. 9,495,484, which claims the benefit of U.S. provisional application titled, "NESTING USING RIGID BODY SIMULATION," filed on Sep. 18, 2012 and having Ser. No. 61/702,663. The subject matter of these related applications is hereby incorporated herein by reference.

BACKGROUND OF THE INVENTION

Field of the Invention

The present invention generally relates to computer software. More specifically, the present invention relates to techniques for nesting parts in two-dimensional (2D) sheets and three-dimensional (3D) volumes using rigid body simulations.

Description of the Related Art

When printing objects from sheets or volumes of materials, manufacturers typically attempt to arrange the objects so as to maximize the use, and minimize the waste, of the materials. One approach manufacturers currently use arranges the object so that their bounding boxes do not intersect. Such an approach works best for square or rectangular, i.e., "box-like" parts, and is less suitable for parts whose shapes are less box-like. As a result, this approach often leads to the waste of material.

SUMMARY OF THE INVENTION

One embodiment of the present invention sets forth a method for nesting a plurality of parts. The method includes receiving the plurality of parts, each part including geometry which represents a 2D or 3D object which is to be manufactured from a material, and performing a rigid body simulation to generate the nesting of the parts, which provides a pattern for manufacturing the 2D or 3D objects represented by the parts from the sheet or volume of the material. The rigid body simulation itself may comprise, for each of one or more of the parts: selecting a location for dropping the part into 2D sheet geometry or 3D volume geometry which represents a sheet or volume of the material, respectively, and simulating a dropping of the part into the 2D sheet geometry or 3D volume geometry from the selected location.

Other embodiments include a computer-readable medium that includes instructions that enable a processing unit to implement one or more embodiments of the disclosed methods as well as a system configured to implement one or more embodiments of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein provide techniques for nesting parts in 2D sheets and 3D volumes. As used herein, "part" refers to geometry representing a 2D or 3D object which is to be manufactured from a material, and "nesting" refers to the process of packing parts within a 2D or 3D boundary. In one embodiment, a nesting application simplifies the shapes of parts and performs a rigid body simulation of the parts dropping into 2D sheet or 3D volume geometry which represents the physical sheet or volume of material from which parts are to be printed. The rigid body simulation is performed as a physics-based simulation (i.e., a mathematical model of one or more objects that describes the motion of those objects relative to a reference point) in which parts are assumed to be rigid (i.e., that they do not deform) and are influenced by forces including gravity. In one embodiment, the parts begin from random initial positions on one or more sides of the 2D sheet or 3D volume, and drop under the force of gravity into the 2D sheet or 3D volume until coming into contact with another part, the boundary of the 2D sheet or 3D volume, or the origin of the gravity (if gravity is modeled as originating from a point within the 2D sheet or 3D volume). The parts may be dropped according to a particular order, such as alternating between large and small parts. Friction may or may not be simulated, or turned off initially to allow free motion and then enabled, so that the simulation finishes quickly. In some embodiments, the rigid body simulation may be translation- and/or position-only, meaning the parts do not rotate and/or do not have momentum, respectively. In a further embodiment, the simulation may treat collisions as inelastic such that parts stop when they experience a collision. Packing the parts more tightly within the 2D sheet or 3D volume may be achieved by incorporating user inputs, such as allowing the user to drag a part into an empty space during the simulation, and jittering the parts using random forces during the simulation, which is akin to "shaking" the parts.

Figure 1A:
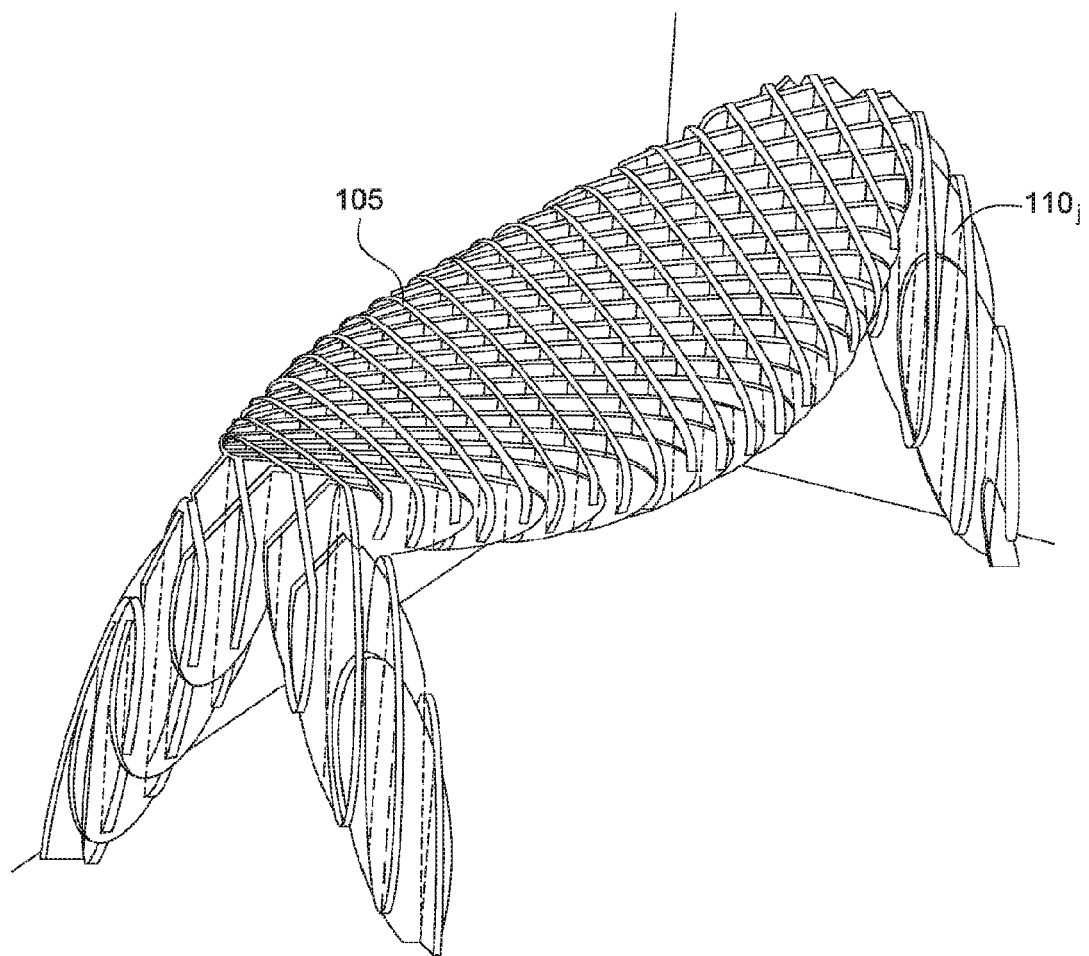
FIGS. 1A-1E illustrate an approach for nesting parts in a sheet, according to an embodiment of the invention.

FIGS. 1A-1E illustrate an approach for nesting parts in a 2D sheet, according to an embodiment. FIG. 1A shows a 3D model 105 which is decomposed into a plurality of parts 110. In general, each of the parts $110_i$ may represent an area (e.g., a region in the plane) or volume (e.g., a cross-section slice) of the 3D model 105. In general, the parts 110 may be generated from the model 105 by any feasible means, such as by cutting the model 105 with slice planes at regular intervals, or by manually dividing the model 105 into separate parts.

Figure 1B:
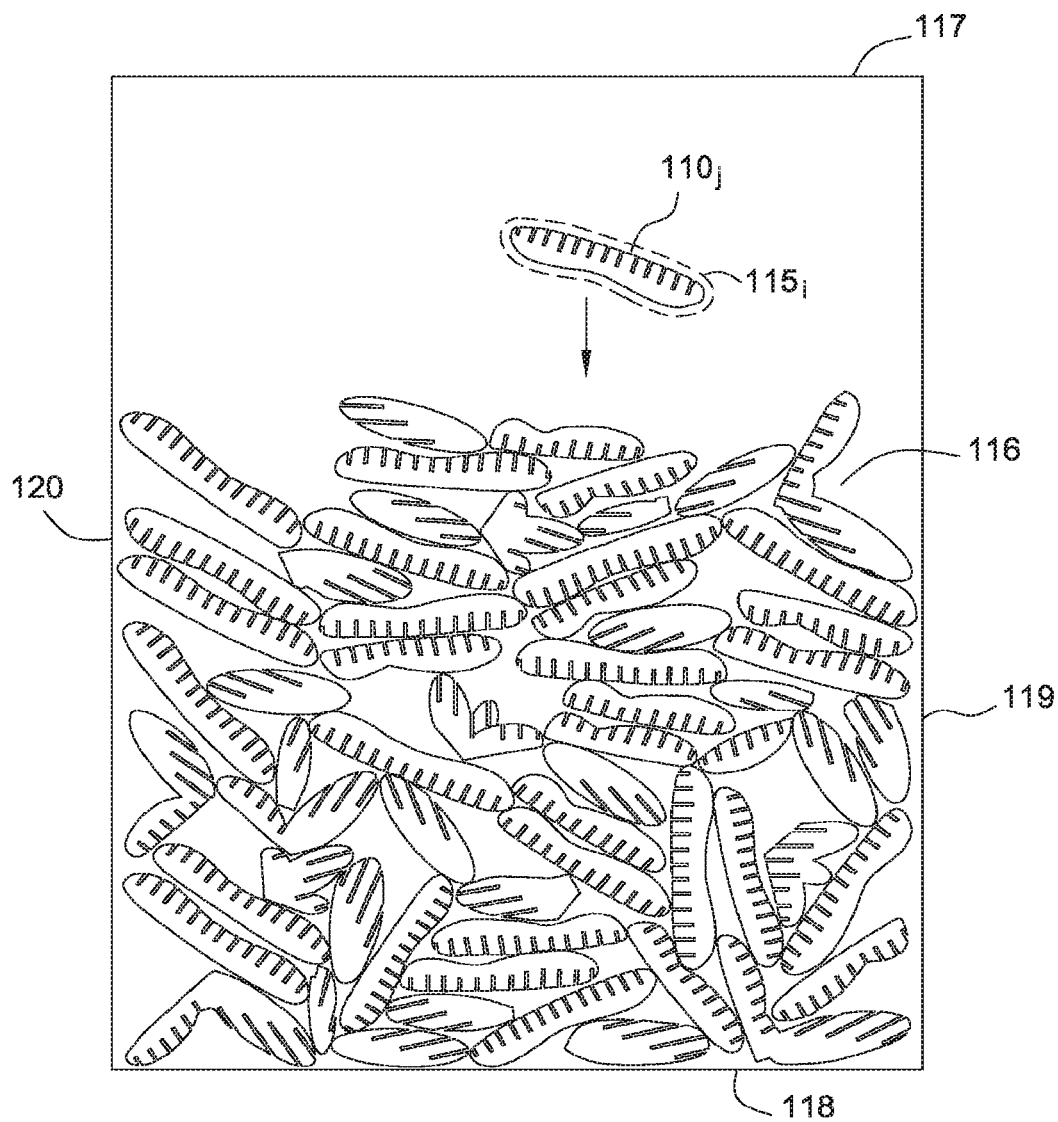

FIG. 1B illustrates a nesting of the parts 110 in a sheet 116 determined by performing a rigid body simulation. In the simulation, the parts 110 are dropped into the sheet 116 through a top side 117 of the sheet. Gravity is modeled as originating from a point infinitely below the sheet 116 such that the parts 110 fall towards a bottom side 117 of the sheet 116. The top side 117 of the sheet 116, from which parts are dropped, is modeled as "open," thereby permitting parts to enter the sheet 116. In contrast, the bottom 117 and the sides 119, 120 of the sheet 116 are modeled as walls with which the parts 110 may collide. In alternative embodiments, the gravity may originate from different locations, such as a point at the center of the sheet 116 or a corner of the sheet 116, and the sheet 116 may have more open sides which permit parts 110 to enter. For example, parts may be dropped from the top and one side of a rectangular sheet, with gravity originating from a bottom corner which is opposite the side from which parts are dropped.

As shown, the shape of part $110_i$ is simplified to shape $115_i$. In general, rigid body simulations are more easily performed using shapes that are round, as opposed to shapes having concave regions and many details. As discussed in greater detail below, the shape of part $110_i$ may be simplified by, e.g., expanding concave regions of the polygon/mesh to push the part $110_i$ towards being convex, as well as removing some details. The simplified shape $115_i$ may further be decomposed into a union of convex pieces so that rigid body simulation may use efficient collision detection algorithms which require convex polygons (or polyhedral, where the parts are 3D).

Once the shapes of parts are simplified, the nesting application may drop the parts 110, beginning from random locations at the top 117 of the sheet 116. Parts 110 may be dropped in a given order to improve packing. For example, experience has shown that alternatively dropping larger and smaller parts may be effective. In such a case, parts greater in size than a given threshold may be separated from those smaller than the threshold. Then, a given number (e.g., 1) of the larger-sized parts may be dropped, after which a given number (e.g., 2) of the smaller-sized parts are dropped, and this process may repeat until the sheet 116 is filled, i.e., further pieces that are dropped can no longer fit in the sheet 116. Note, even if one piece which is dropped cannot fit, the nesting application may attempt, for up to a given number of times, to drop the piece again from a different random location. After trying for the given number of times, the nesting application may move on to another piece until, e.g., a given number of pieces have been unable to fit. At that time, the nesting application may begin dropping the remaining pieces, including those that did not fit, in another sheet.

In one embodiment, the simulation may be translation-only such that the parts cannot rotate. Doing so may keep the parts aligned along a particular orientation, such as a strong axis of a material. In another embodiment, the simulation may be position-only such that the parts have no momentum, thereby minimizing potential energy directly rather than unnecessarily exchanging between kinetic and potential energy.

Figure 1C:
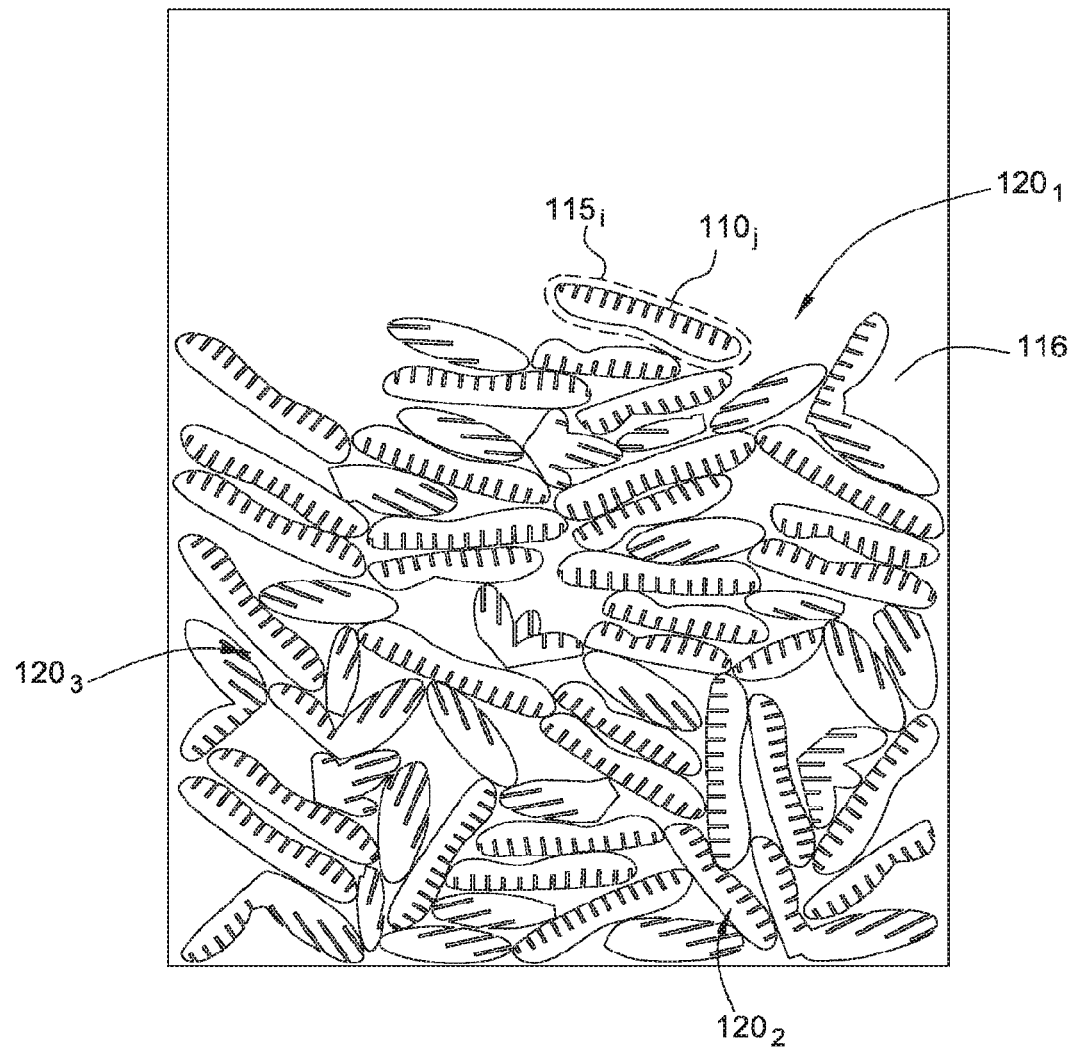

FIG. 1C illustrates the result of the simulation of dropping parts. As shown, the parts $110_i$ have settled and are packed in sheet 116. Illustratively, roughly three-quarters of the sheet 116 is used for parts, while approximately one-quarter of the sheet remains available. In another embodiment, the nesting application may scale the parts and perform further rigid body simulations to determine the largest parts which may be printed from the sheet 116.

As further shown in FIG. 1C, the nesting application may simulate jittering the parts 110 using random forces $120_{1-3}$ that act on one or a number of the parts 110, as part of the rigid body simulation. Similar to the gravitational force which causes the parts 110 to drop, the random forces $120_{1-3}$ may act on the parts 110 to cause the parts to translate, rotate, collide with other parts or walls of the sheet 116, etc. Doing so is analogous to shaking the parts 110. In one embodiment, the nesting application may simulate the application of random forces, then accept the resulting configuration of parts if the packing density, i.e., the density of the parts in the packed configuration, increases. In another embodiment, the jittering of parts with random forces may be combined with simulated annealing. During each iteration of the simulated annealing, random forces are applied and new configurations accepted or rejected based on an energy corresponding to the packing density. Higher energies (i.e., lower packing densities) after a step may be accepted as well, but the probability of such acceptance is proportional to a temperature, which is lowered at each iteration based on a cooling schedule.

In yet another embodiment, multiple dropping simulations may be performed, the results of which may be the starting points for jittering simulations. Then, after the jittering simulations are performed, the tightest packing among the multiple simulations may be chosen. In another embodiment, the jittering simulations may be omitted, and a tightest packing among multiple dropping simulations may be chosen instead. As used herein, a tighter packing refers to a configuration of parts which is more dense, i.e., a configuration in which there are more parts per area or volume of the sheet/volume. In a tighter packing, less area or volume of the sheet/volume is needed to produce a set of non-overlapping parts.

Figure 1D:
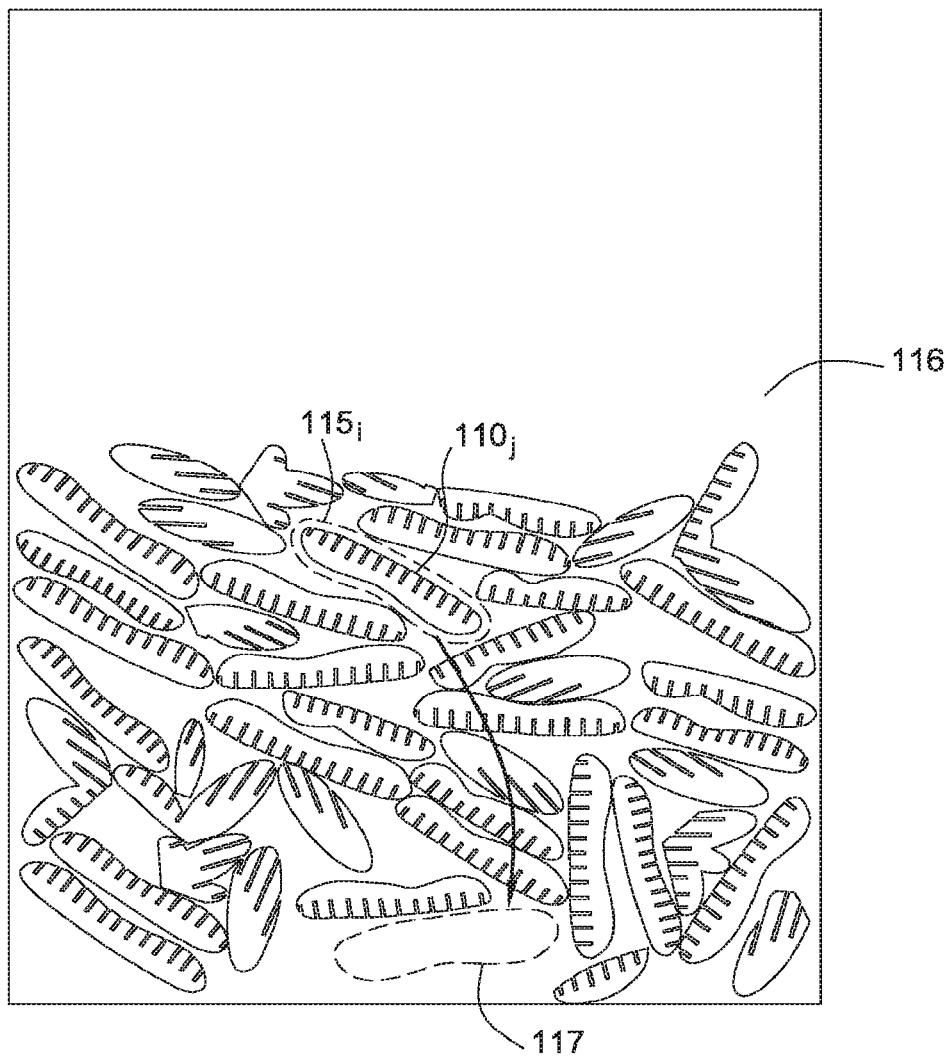
Figure 1E:
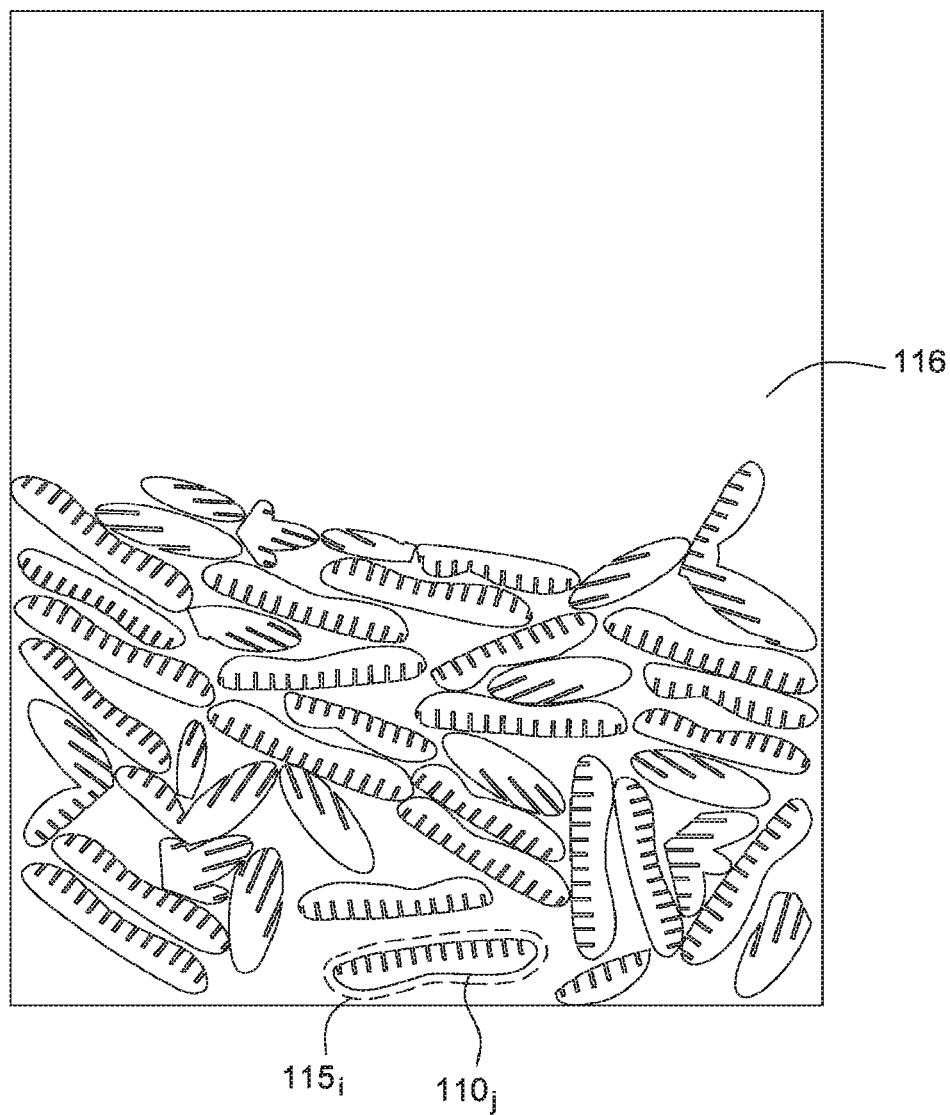

FIG. 1D illustrates the result of the jittering simulation. As shown, the parts 110 have settled and are packed in a different configuration in sheet 116 than before the jittering simulation. As discussed, the configuration may be accepted only if its packing density is greater than the previous configuration. As further shown, a user drags the part $110_i$ to location 117. In general, user input may be used to change the results of the rigid body simulation to achieve a tighter packing of the parts 110, or some other objective, such as aligning parts along a strong axis of a material where the material is non-homogenous. In one embodiment, the rigid-body simulation may be active during the drag of part $110_i$ to location 117. In such a case, the act of dragging part $110_i$, may displace some of the other parts 110 to a new configuration, depicted in FIG. 1E.

Although discussed above primarily with respect to a rectangular sheet 116, other 2D sheets and 3D volumes of any size and shape may be used instead. For example, the rigid body simulation may drop parts into a 3D volume where parts are being printed from a 3D block of material, as opposed to a 2D sheet of material.

Figure 2:
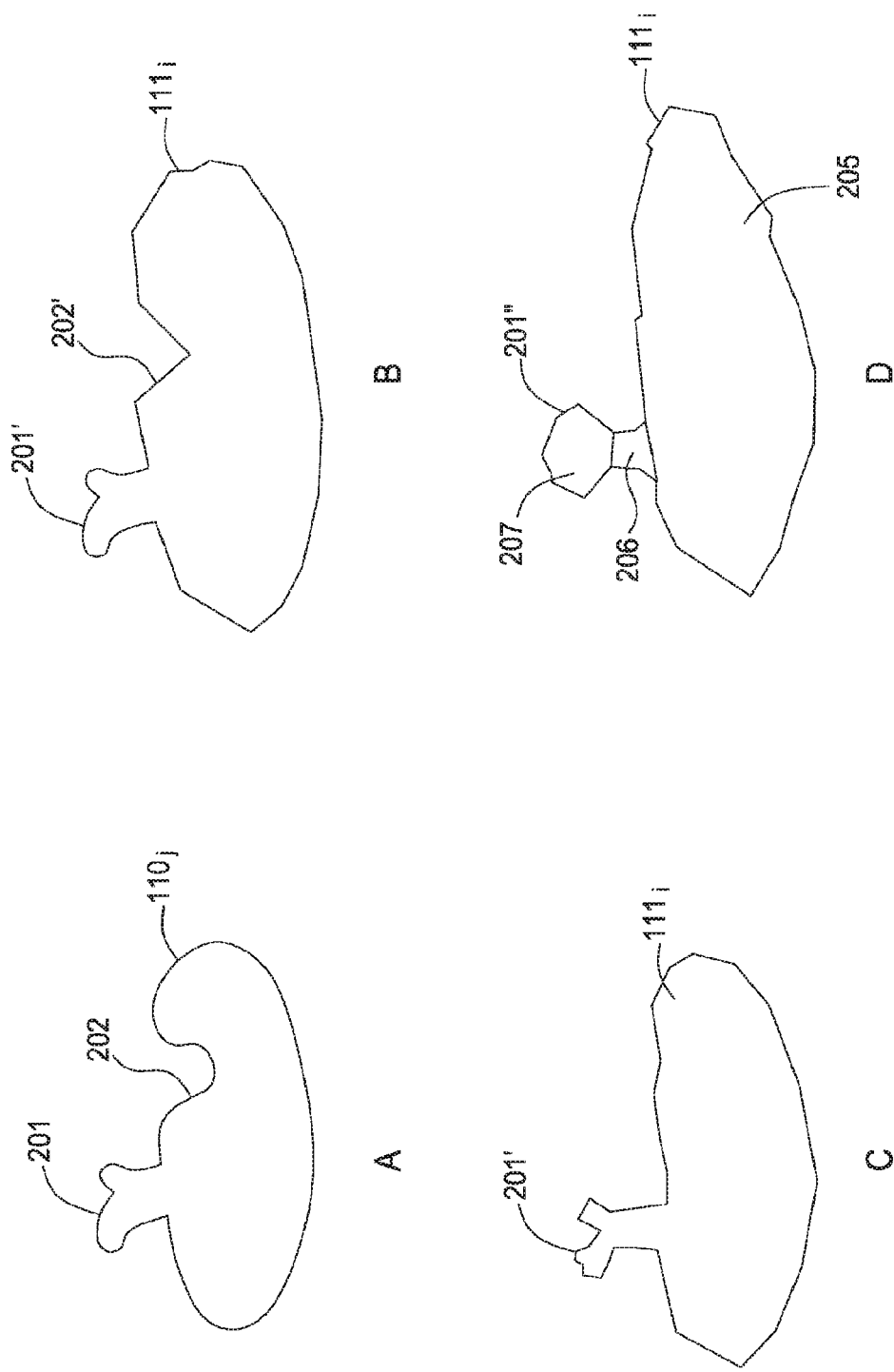
FIG. 2 illustrates an approach for simplifying the shapes of parts, according to an embodiment of the invention.

FIG. 2 illustrates an approach for simplifying the shapes of parts, according to an embodiment. As shown in panel A, the part 110.sub.i which is received by a nesting application may include smooth borders, a concave region 202, and a detailed region 201. Illustrative, the part $110_i$ is preprocessed into a polygon $111_1$, as shown in panel B. In 3D, parts may be preprocessed into triangle meshes. Algorithms for generating polygons and triangle meshes from arbitrary geometry are well-known and publicly available. As further shown in panel B, the polygon $111_i$ representing part $110_i$, includes a concave region 202' corresponding to the concave region 202 of the part $110_i$, as well as a region 201' corresponding to the detailed region 201 of the part $110_i$.

Rigid body simulations are more efficiently performed using shapes that are round, as opposed to shapes having concave regions and many details. As a result, the nesting application may simplify the shape of the polygon $111_i$ by expanding concave regions of the polygon $111_i$ to push it towards being convex. For example, the nesting application may add an edge to eliminate the concave region 202', the result of which is shown in panel C. This corresponds to adding a new triangle of material to eliminate the concave vertex.

In addition, the nesting application may remove some details. As shown in panel D, detailed region 201' has been simplified into region 201", in which the details of region 201' have been eliminated. In one embodiment, expanding concave regions outwards and removing details may be performed in a "safe" manner such that an intersection-free simulation with the simplified shapes results in an intersection-free final layout of the original shapes. In other words, new triangles of material which eliminate concave regions are added, but not removed.

As shown, the polygon $111_i$ is further decomposed into a union of convex pieces 205-207. Doing so permits the rigid body simulation to make use of efficient collision detection algorithms which require convex polygons. Algorithms for decomposing polygons $111_i$, are well-known and publicly available, but such algorithms are typically slow. One embodiment instead uses a fast greedy algorithm which starts at a chosen works and picks out a maximal convex subpolygon by walking around the original polygon maintaining convexity. The subpolygon is then removed and the process continued until the entire original is explored. Although depicted as non-overlapping, the convex pieces 205 into which the polygon $111_i$ is decomposed may overlap in some embodiments, so long as the union of the convex pieces 205 includes the entire geometry of the part $110_i$.

Although discussed above primarily with respect to simplifying and decomposing a 2D part $110_i$ into convex polygons, similar steps may be performed to simplify a 3D part and decompose the 3D part into convex polyhedral.

Figure 3:
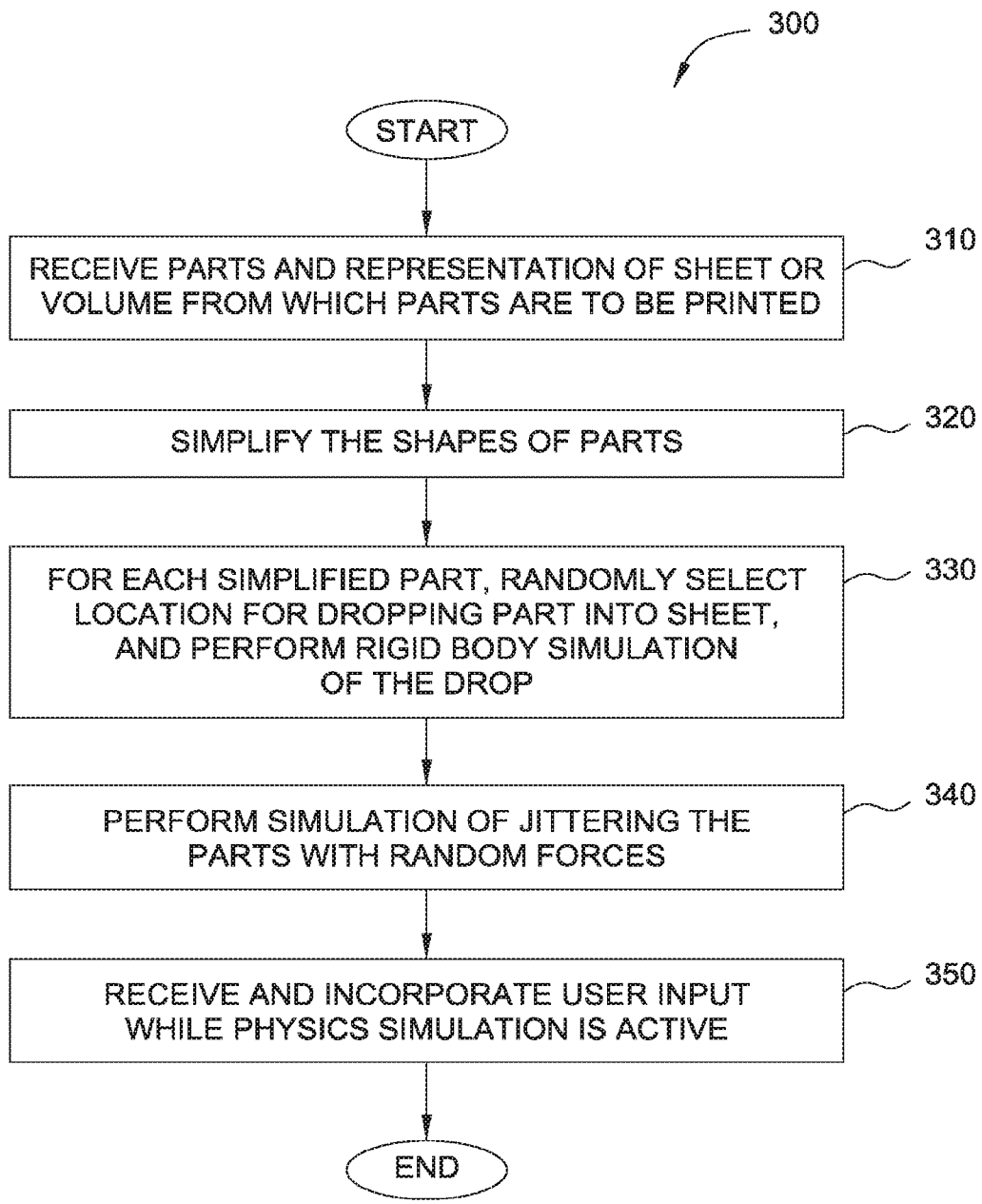
FIG. 3 illustrates a method for nesting parts using a rigid body simulation, according to an embodiment of the invention.

FIG. 3 illustrates a method 200 for nesting parts using a rigid body simulation, according to an embodiment. As shown, the method 300 begins at step 210, where a nesting application receives 2D or 3D parts and a representation of a sheet or volume from which the parts are to be printed. In general, the sheet or volume being represented may be of any shape or size. In some cases, the physical sheet or volume may be used, i.e., pieces may have previously been cut from it. In such a case, one or more photographs may be taken of the physical sheet or volume, and the holes where pieces were previously cut may be reconstructed using, e.g., vision algorithms. That is, the nesting application (or some other application) may determine the shapes, sizes, and orientations of the holes using any feasible vision algorithm, such as an algorithm which extracts edges corresponding to holes from the photographs. Such holes may then be added as obstacles in the rigid body simulation, discussed below, so that parts which are dropped collide with the holes during the simulation.

At step 320, the nesting application simplifies the shapes of the received parts. In one embodiment, e.g., the shapes may be preprocessed into polygons in 2D or triangle meshes in 3D, the polygons or meshes may be simplified, and then the polygons/meshes may be decomposed into convex polygons/meshes. As discussed, rigid body simulations are more efficiently performed using shapes that are round, as opposed to shapes having concave regions and many details. As a result, the shape simplification may include expanding concave regions of the polygon/mesh to push it towards being convex. The shape simplification may further include removing some details. Both expanding concave regions outwards and removing details may be performed in a "safe" manner such that an intersection-free simulation with the simplified shapes results in an intersection-free final layout of the original shapes. The simplified shapes may further be decomposed into a union of convex pieces. In such a case, the rigid body simulation may use fast collision detection algorithms for convex polygons and polyhedra, making the simulation more efficient.

At step 330, the nesting application selects, for each simplified part, a location for dropping the part into the sheet or volume, and the nesting application then performs a rigid body simulation of the drop. Here, the drops may begin from one or more open sides of the sheet or volume, with the remaining sides of the sheet/volume being walls with which the dropped parts may collide. The parts may be dropped in any given order, such as randomly, larger parts first, alternating between large and small parts, etc. Experience has shown that alternating between large and small parts is an effective approach for tightly packing parts. Gravity may originate from any point, such as an infinitely distant point, from the center of the sheet/volume, from a corner of the sheet/volume, etc. For example, 3D printers often have a preferential corner from which printing begins. In such a case, gravity may originate from the preferential corner. In one embodiment, the nesting application may perform the rigid body simulation of drops according to FIG. 4, discussed below. The orientation of the parts may be random, or nonrandom. For example, in non-homogenous materials having a stronger axis, parts may be aligned with this axis so that the printed objects may benefit from the strength of the material along that axis. Advantageously, the rigid body simulation is a relatively computationally inexpensive operation to perform. As a result, a reasonably tight packing of the parts in the sheet/volume may be quickly obtained.

As discussed, the simulation may be translation-only such that the parts cannot rotate. Doing so may keep the parts aligned along a particular orientation, such as a strong axis of a material. In another embodiment, the simulation may be position-only such that the parts have no momentum, thereby minimizing potential energy directly rather than unnecessarily exchanging between kinetic and potential energy.

At step 340, the nesting application simulates jittering of the parts with random forces. After the dropping of pieces is simulated, tighter packing of the parts may be achieved by such jittering of the parts. Doing so is analogous to shaking the sheet/volume to allow the parts to settle. In one embodiment, the nesting application may simulate the application of such random forces, then accept the resulting configuration of parts if the packing density increases. If longer computation times are available, the jittering of parts with random forces may further be combined with simulated annealing. For example, random forces may be applied and new configurations accepted or rejected at each iteration of the simulated annealing process based on an energy corresponding to the packing density. Higher energies (i.e., lower packing densities) after a step may be accepted, but the probability of such acceptance may be proportional to a temperature, which is lowered at each iteration of the simulated annealing based on a cooling schedule. In yet another embodiment, multiple dropping simulations may be performed, the results of which may be the starting points for the jittering simulations. Then, after the jittering simulations are performed, the tightest packing among the multiple simulations may be chosen. Of course, the jittering simulations may be omitted, and a tightest packing among multiple dropping simulations chosen.

At step 350, the nesting application receives and incorporates user input. Doing so may help further improve the packing density of the parts within the sheet/volume. For example, an interface may present the rigid body simulation, pausing periodically to permit a user to drag parts to empty areas of the sheet. The nesting application may then determine a reconfiguration of all of the parts, given the relocation of the part by the user, by simulating the drop of the parts under the force of gravity after the part which the user chose is removed and relocated. Note, a user may also choose to relocate or reorient parts for reasons other than improving packing density. For example, the user may relocate or reorient parts to take advantage of certain characteristics of the sheet or volume such as a stronger axis, to give preferential space to certain parts such as large parts, and the like. The nesting application may also incorporate user input that is provided after the rigid body or jittering simulations of steps 230 and 240. In such cases, the rigid body simulation may still be active, and the nesting application may reconfigure the parts based on the user input, similar to the discussion above.

In one embodiment, a machine such a 3D printer may receive the configuration of parts output by the nesting application. The machine may then cut or otherwise remove areas represented by the parts from a physical sheet or volume, according to the configuration of parts. For example, the physical sheet or volume may include metal, textiles, wood, and other materials, and the machine may cut the sheet or volume into shapes using, e.g., stamping, water jet, laser cutters, and the like. Of course, the areas represented by the parts may be manually cut from the sheet/volume as well.

Figure 4:
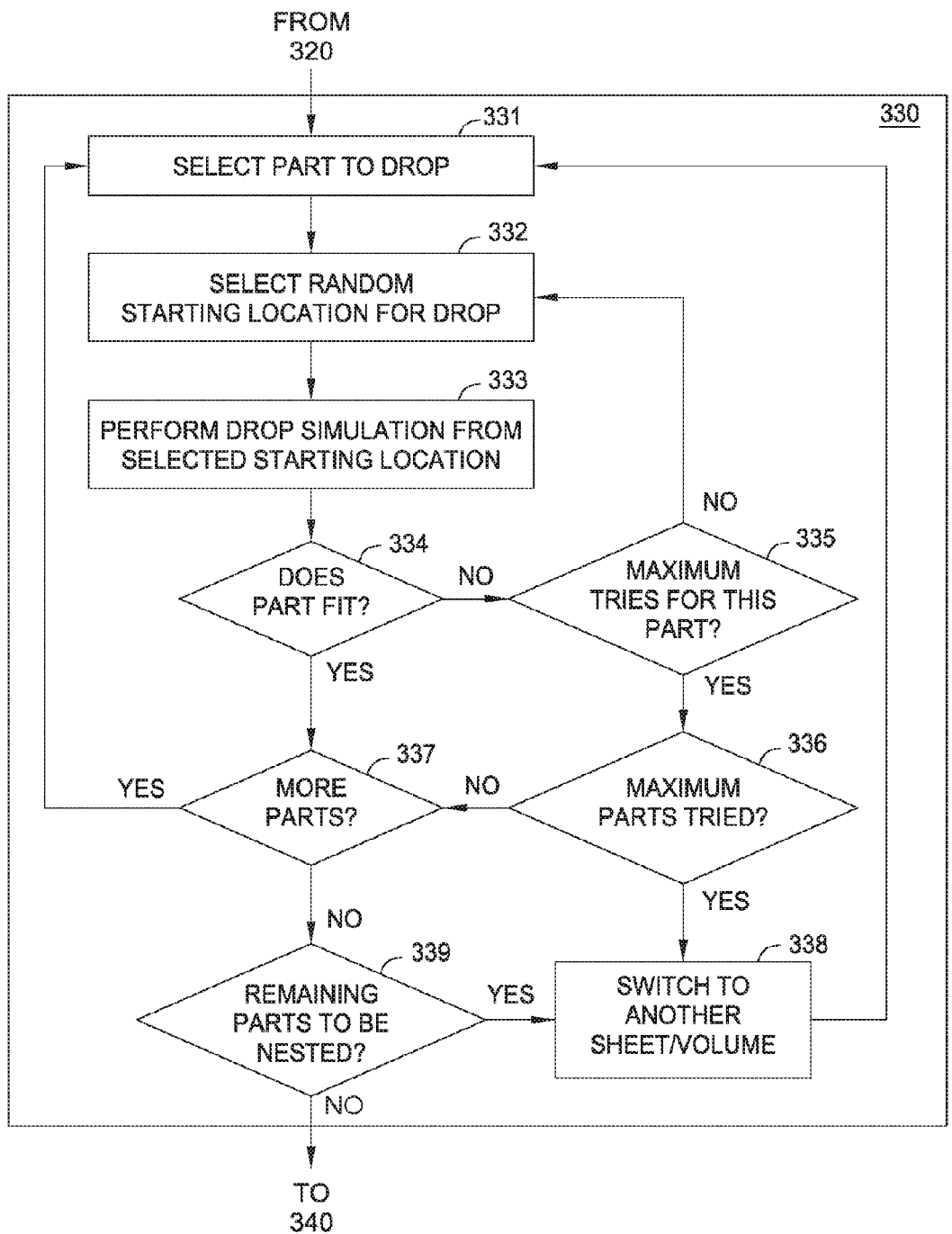
FIG. 4 illustrates one of the steps shown in FIG. 3, according to an embodiment of the invention.

FIG. 4 further illustrates step 330 of FIG. 3, according to an embodiment. At step 331, the nesting application selects a part to drop in the rigid-body simulation. Generally, parts may be dropped in any order. Experience has shown an effective order is to alternatively drop larger and smaller parts. For example, parts greater in size than a given threshold may be separated from those smaller than the threshold. Then, a given number (e.g., 1) of the larger-sized parts may be dropped, after which a given number (e.g., 2) of the smaller-sized parts are dropped, and this process may repeat until the sheet is filled. Of course, other orders are possible, e.g., larger parts followed by smaller parts, dropping parts at random, etc.

At step 332, the nesting application selects a random location for the drop. Then, at step 333, the nesting application performs the drop simulation, beginning from the selected random location. As discussed, the drop may also be performed beginning from a random orientation, or a non-random orientation. In one embodiment, collisions may be simulated as inelastic such that the parts settle immediately after colliding with another object (e.g., a wall or another part). This approach is generally more efficient than simulating elastic bounces. For example, parts may be simulated as having zero mass to produce inelastic collisions. In alternative embodiments, the parts may instead be simulated with some mass, and collisions may be elastic. In other embodiments, the parts and the walls of the sheet/volume may be simulated as having zero friction coefficients, or non-zero friction coefficients, so that the parts slide against each other and the wall, or stick without sliding, respectively.

In other embodiments, the rigid body simulation may be translation-only or position-only for some (or all) of the parts. As used herein, a "translation-only" simulation is one in which the translational positions of parts are adjusted, but not their rotations. In one embodiment, the simulation may treat the parts as having infinite moments of inertia so that the parts do not rotate. For example, materials such as textiles have a strong axis, and the parts may be aligned with the strong axis throughout the translation-only simulation.

In position-only simulations, the simulation may be performed with no momentum variables. Only the final configuration of the parts is important for determining a parts layout on a sheet or volume of materials, not the trajectories those parts take to reach a final position. Performing the simulation without momentum variables thus optimizes the simulation by minimizing potential energy directly rather than exchanging between kinetic and potential energy. Similarly, the nesting application may perform the simulation without a time variable. In such a case, each rigid part may simply be moved along the energy minimizing path as far as possible until the part collides with another object or comes to the origin of gravity.

At step 334, the nesting application determines whether the part fits in the sheet or volume after the drop. That is, the nesting application determines whether any area or volume of the part lies outside of the area or volume of the 2D sheet or 3D volume subsequent to the simulation. If the part fits in the sheet or volume, the method 300 continues at step 337, where the nesting application determines whether there are additional parts to drop, and, if such is the case, the method 300 returns to step 331, where the nesting application selects another part to drop.

If the part does not fit in the sheet or volume, then at step 335, the nesting application determines whether a maximum number of tries have been attempted for the part. If such is not the case, the nesting application may make further attempt(s) to drop the part into the sheet or volume. That is, the method 300 returns to step 332, where the nesting application selects a new random location for performing the drop. In one embodiment, the nesting application may also select a different orientation for the part, such as a random orientation.

If a maximum number of tries have been attempted, then at step 336, the nesting application determines whether the maximum number of parts have been tried. That is, the nesting application may try to fit a given number of parts (e.g., 10), each for up to a given number of times (e.g., 10). The number of parts tried, and the number of tries for each part, may be user-specified or automatically determined.

If the maximum number of parts have been tried, then at step 338, the nesting application may switch to another sheet or volume, and then select another part to drop into that sheet or volume at step 331. If, on the other hand, the maximum number of parts have not yet been tried, then at step 337, the nesting application determines whether there are additional parts to try. If such is the case, the method 300 returns to step 331, where the nesting application selects another part to drop. If, however, no parts remain to be tried, the method 300 continues at step 339, where the nesting application determines whether any parts remain to be nested. The remaining parts may include parts that could not fit into the current (and any previous) sheet or volume. If remaining parts exist, then at step 338, the nesting application switches to another sheet or volume into which the remaining parts may be dropped.

Figure 5:
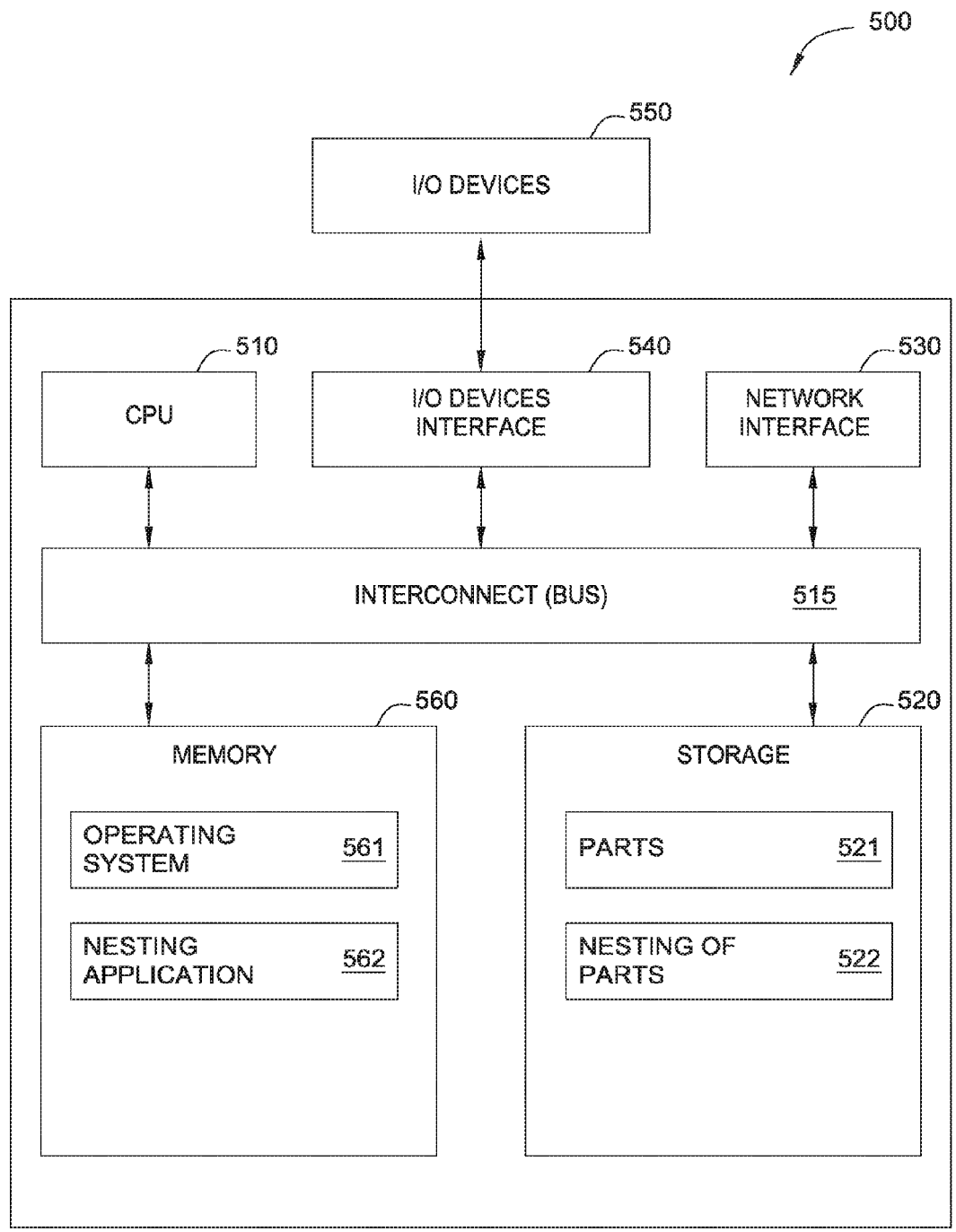
FIG. 5 illustrates a computer system configured to implement one or more aspects of the present invention.

FIG. 5 illustrates a computer system 500 configured to implement one or more aspects of the present invention. As shown, the system 500 includes, without limitation, a central processing unit (CPU) 510, a network interface 530, an interconnect 515, a memory 560, and storage 520. The system 500 may also include an I/O device interface 540 connecting I/O devices 550 (e.g., keyboard, display and mouse devices) to the system 500.

The CPU 510 retrieves and executes programming instructions stored in the memory 560. Similarly, the CPU 510 stores and retrieves application data residing in the memory 560. The interconnect 515 facilitates transmission, such as of programming instructions and application data, between the CPU 510, I/O device interface 540, storage 520, network interface 530, and memory 560. CPU 510 is included to be representative of a single CPU, multiple CPUs, a single CPU having multiple processing cores, and the like. And the memory 560 is generally included to be representative of a random access memory. The storage 520 may be a disk drive storage device. Although shown as a single unit, the storage 520 may be a combination of fixed and/or removable storage devices, such as fixed disc drives, floppy disc drives, tape drives, removable memory cards or optical storage, network attached storage (NAS), or a storage area-network (SAN). Further, system 500 is included to be representative of a physical computing system as well as virtual machine instances hosted on a set of underlying physical computing systems. Further still, although shown as a single computing system, one of ordinary skill in the art will recognized that the components of the system 500 shown in FIG. 5 may be distributed across multiple computing systems connected by a data communications network.

As shown, the memory 560 includes an operating system 561 and a nesting application 562. The nesting application 562 is configured to determine a packing of parts within a boundary of a 2D sheet or 3D volume. In one embodiment, the nesting application 562 may perform a rigid body simulation of the parts dropping into the 2D sheet or 3D volume, as discussed above with respect to FIG. 3. As discussed, the rigid-body simulation may include various optimizations, such as being position-only or translation-only. Doing so may permit the simulation to be more efficient, or take advantage of certain material properties, such as a stronger axis along which parts may be aligned. In addition, the nesting application 562 may perform, as part of the rigid-body simulation, a simulation of jittering the parts with random forces and/or a simulated annealing after the dropping simulation to identify a tighter packing of the parts. The nesting application 562 may further incorporate user input while the rigid-body simulation is active, as discussed above with respect to FIGS. 2 and 3. For example, the user may relocate or reorient parts to take advantage of certain characteristics of the sheet or volume such as a stronger axis, to give preferential space to certain parts such as large parts, and the like. The nesting application 562 may further send a configuration of parts to a machine that is able to cut or otherwise remove areas represented by the parts from a physical sheet or volume. Of course, the areas represented by the parts may also be manually cut from the sheet/volume based on the configuration of parts.

Advantageously, embodiments presented herein permit parts to be arranged on a material so as to make effective use of the material in 3D printing or manufacturing. Further, a rigid body simulation is a relatively computationally inexpensive to perform, so nesting operations may be performed quickly.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A computer-implemented method for generating a manufacturing pattern for a plurality of parts, the method comprising:
  performing, via a processor, a rigid-body simulation for the plurality of parts, wherein, for each part included in the plurality of parts, the rigid-body simulation comprises:
    selecting a location at which to drop the part into a two-dimensional (2D) sheet geometry or into a three-dimension (3D) volume geometry, wherein the 2D sheet geometry represents a sheet of a material to be used to manufacture an object represented by the part, and wherein the 3D volume geometry represents a volume of a material to be used to manufacture a 3D object represented by the part, and
    performing a simulation of dropping the part into the 2D sheet geometry or into the 3D volume geometry from the selected location; and
  generating, via the processor, a nesting of the parts based on the simulations, wherein the nesting of parts provides a pattern for manufacturing the objects represented by the plurality of parts from the sheet of the material or for manufacturing the 3D objects represented by the plurality of parts from the volume of the material.

2. The computer-implemented method of claim 1, further comprising, simplifying the shapes of the parts included in the plurality of parts prior to performing the rigid-body simulation.

3. The computer-implemented method of claim 2, wherein, for each part included in the plurality of parts, simplifying includes expanding concave regions of a polygon or mesh representing the part, and wherein each polygon or mesh is further decomposed into a union of convex pieces after the simplification.

4. The computer-implemented method of claim 1, wherein performing the rigid-body simulation further comprises:
  jittering the parts included in the plurality of parts with random forces; and
  accepting a packing configuration after jittering the parts if a packing density of the parts in the 2D sheet geometry or 3D volume geometry increases.

5. The computer-implemented method of claim 4, wherein performing the rigid-body simulation further comprises performing a simulated annealing, wherein a new configuration after jittering the parts and performing the simulated annealing is accepted based on a temperature value and a change in packing density.

6. The computer-implemented method of claim 1, further comprising:
receiving user input repositioning a first part included the plurality of parts; and
while performing the rigid-body simulation, repositioning the first part according to the user input.

7. The computer-implemented method of claim 1, wherein the rigid-body simulation comprises a position-only simulation for at least one part included in the plurality of parts in which at least one of a momentum variable and a time variable is zero.

8. The computer-implemented method of claim 1, wherein the rigid-body simulation comprises a translation-only simulation for at least one part included in the plurality of parts in which the at least one part is modeled as having infinite moments of inertia.

9. The computer-implemented method of claim 1, wherein the 2D sheet geometry or the 3D volume geometry includes holes that are modeled as obstacles in the rigid-body simulation.

10. The computer-implemented method of claim 1, wherein, in the rigid-body simulation, a first predefined number of large parts and a second predefined number of small parts are dropped interchangeably.

11. A non-transitory computer-readable storage medium including instructions that, when executed by a processor, configure the processor to perform the steps of:
performing a rigid-body simulation for a plurality of parts, wherein, for each part included in the plurality of parts, the rigid-body simulation comprises
performing one or more operations to simulate dropping the part into a two-dimensional (2D) sheet geometry or into a three-dimension (3D) volume geometry, wherein the 2D sheet geometry represents a sheet of a material to be used to manufacture an object represented by the part, and wherein the 3D volume geometry represents a volume of a material to be used to manufacture a 3D object represented by the part; and
generating a nesting of the parts based on the simulation, wherein the nesting of parts provides a pattern for manufacturing the objects represented by the plurality of parts from the sheet of the material or for manufacturing the 3D objects represented by the plurality of parts from the volume of the material.

12. The non-transitory computer-readable storage medium of claim 11, further comprising, simplifying the shapes of the parts included in the plurality of parts prior to performing the rigid-body simulation.

13. The non-transitory computer-readable storage medium of claim 12, wherein, for each part included in the plurality of parts, simplifying includes expanding concave regions of a polygon or mesh representing the part, and wherein each polygon or mesh is further decomposed into a union of convex pieces after the simplification.

14. The non-transitory computer-readable storage medium of claim 11, wherein performing the rigid-body simulation further comprises:
jittering the parts included in the plurality of parts with random forces; and
accepting a packing configuration after jittering the parts if a packing density of the parts in the 2D sheet geometry or 3D volume geometry increases.

15. The non-transitory computer-readable storage medium of claim 14, wherein performing the rigid-body simulation further comprises performing a simulated annealing, wherein a new configuration after jittering the parts and performing the simulated annealing is accepted based on a temperature value and a change in packing density.

16. The non-transitory computer-readable storage medium of claim 11, further comprising:
receiving user input repositioning a first part included the plurality of parts; and
while performing the rigid-body simulation, repositioning the first part according to the user input.

17. The non-transitory computer-readable storage medium of claim 11, wherein the rigid-body simulation comprises a position-only simulation for at least one part included in the plurality of parts in which at least one of a momentum variable and a time variable is zero.

18. The non-transitory computer-readable storage medium of claim 11, wherein the rigid-body simulation comprises a translation-only simulation for at least one part included in the plurality of parts in which the at least one part is modeled as having infinite moments of inertia.

19. The non-transitory computer-readable storage medium of claim 11, wherein the 2D sheet geometry or the 3D volume geometry includes holes that are modeled as obstacles in the rigid-body simulation.

20. The non-transitory computer-readable storage medium of claim 11, wherein, in the rigid-body simulation, a first predefined number of large parts and a second predefined number of small parts are dropped interchangeably.

21. A system, comprising:
a memory storing instructions; and
a processor that is coupled to the memory and, when executing the instructions, is configured to:
perform a simulation for a plurality of parts, wherein, for each part included in the plurality of parts, the simulation comprises
performing one or more operations to simulate dropping the part into a two-dimensional (2D) sheet geometry or into a three-dimension (3D) volume geometry; and
generate a nesting of the parts based on the simulation, wherein the nesting of parts provides a pattern for manufacturing objects represented by the plurality of parts from a sheet of material represented by the 2D sheet geometry or for manufacturing 3D objects represented by the plurality of parts from a volume of material represented by the 3D volume geometry.

* * * * *